(12) United States Patent
Xin et al.

(10) Patent No.: US 7,468,745 B2
(45) Date of Patent: Dec. 23, 2008

(54) MULTIVIEW VIDEO DECOMPOSITION AND ENCODING

(75) Inventors: Jun Xin, Quincy, MA (US); Emin Martinian, Arlington, MA (US); Anthony Vetro, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 824 days.

(21) Appl. No.: 11/015,390

(22) Filed: Dec. 17, 2004

(65) Prior Publication Data

US 2006/0132610 A1 Jun. 22, 2006

(51) Int. Cl.
*H04N 5/225* (2006.01)
(52) U.S. Cl. .................................. 348/218.1
(58) Field of Classification Search ............ 348/207.99, 348/218.1
See application file for complete search history.

(56) References Cited

OTHER PUBLICATIONS

Ohm et al, "Interframe wavelet coding-motion picture representation for universal scalability," Signal Processing: Image Communication, vol. 19, No. 9, pp. 877-908, Oct. 2004.
Chang, et al, "Inter-view wavelet compression of light fields with disparity compensated lifting," SPIE Conf on Visual Communications and Image Processing, 2003.
ISO/IEC 14496-2, "Information technology—Coding of audio-visual objects—Part 2: Visual," 2nd Edition, 2001.
Buehler et al., "Unstructured Lumigraph Rendering," Proc. ACM SIGGRAPH, 2001.

*Primary Examiner*—David Ometz
*Assistant Examiner*—Akshay Trehan
(74) *Attorney, Agent, or Firm*—Dirk Brinkman; Gene Vinokur

(57) ABSTRACT

A method decomposes multiview video acquired of a scene by multiple cameras. Each multiview video includes a sequence of frames, and each camera provides a different view of the scene. A prediction mode is selected from a temporal prediction mode, a spatial prediction mode, and a view interpolation prediction mode. The multiview videos are then decomposed into low band frames, high band frames, and side information according to the selected prediction mode.

20 Claims, 8 Drawing Sheets

MULTIVIEW VIDEO DECOMPOSITION AND ENCODING

FIELD OF THE INVENTION

This invention relates generally to video encoding, and more particularly to encoding multiview videos.

BACKGROUND OF THE INVENTION

Multiview video encoding is essential for applications such as 3D television (3DTV), free viewpoint television (FTV), and multi-camera surveillance. Multiview video encoding is also known as dynamic light field compression.

FIG. 1 shows a prior art 'simulcast' system 100 for multiview video encoding. Cameras 1-4 acquire 'views' 101-104 of a scene, where the input views from each camera are typically time synchronized. The views are encoded 111-114 independently to corresponding encoded views 121-124. That system uses conventional 2D video encoding techniques. However, that system does not correlate the different camera views. Independent encoding decreases compression efficiency, and thus network bandwidth and storage are increased. For a large number of cameras, inter-view correlation would greatly increase the efficiency of a multiview encoder.

FIG. 2 shows a prior art disparity compensated prediction system 200 that uses inter-view correlations. Views 201-204 are encoded 211-214 to encoded views 231-234. The views 201 and 204 are encoded independently using a standard video encoder such as MPEG-2 or H.264. These independently encoded views are 'reference' views. The remaining views 202-203 are encoded using temporal prediction and inter-view predictions based on reconstructed reference views 251-252 obtained from decoders 221-222. Typically, the prediction is determined adaptively on a per block basis, S. C. Chan, K. T. Ng, Z. F. Gan, K. L. Chan, and H.-Y. Shum, "The data compression of simplified dynamic light fields," Proc. IEEE Int. Acoustics, Speech, and Signal Processing Conf., April, 2003.

FIG. 3 shows a prior art 'lifting-based' wavelet decomposition, see W. Sweldens, "The Lifting Scheme: A Custom-Design Construction of Biorthogonal Wavelets," J. Appl. Comp. Harm. Anal., vol. 3, no. 2, pp. 186-200, 1996. Wavelet decomposition is an effective technique for static light field compression. Input samples 301 are split 310 into odd samples 302 and even samples 303. The odd samples are predicted 320 from the even samples. A prediction error forms high band samples 304. The high band samples are used to update 330 the even samples to form low band samples 305. That decomposition is invertible so that linear or non-linear operations can be incorporated into the prediction and update steps.

The lifting scheme enables a motion-compensated temporal transform, i.e., motion compensated temporal filtering (MCTF), which for videos essentially filters along a temporal motion trajectory. A review of MCTF for video coding is described by Ohm et al, "Interframe wavelet coding—motion picture representation for universal scalability," Signal Processing: Image Communication, Vol. 19, No. 9, pp. 877-908, October 2004. The lifting scheme can be based on any wavelet kernel such as Harr or 5/3 Daubechies, and any motion model such as block-based translation or affine global motion, without affecting a perfect reconstruction.

For encoding, the MCTF decomposes the video into high band frames and low band frames, which are then subjected to spatial transforms to reduce any remaining spatial correlations. The transformed low and high band frames, along with associated motion information, are entropy coded to form an encoded bitstream. MCTF can be implemented with the lifting scheme shown in FIG. 3, with the temporally adjacent videos as input. In addition, MCTF can be applied recursively to the output low band frames.

MCTF-based videos have a compression efficiency comparable to that of video compression standards such as H.264/AVC. In addition, the videos have inherent temporal scalability. However, that method cannot be applied directly to multiview video coding in which a correlation between the multiple views is exploited because there is no efficient method for predicting views that also accounts for correlation in time.

The lifting scheme has also been used to encode static light fields, i.e., single multiview images. Rather than performing a motion-compensated temporal filtering, the encoder performs a disparity compensated inter-view filtering (DCVF) across the static views in the spatial domain, see Chang, et al, "Inter-view wavelet compression of light fields with disparity compensated lifting," SPIE Conf on Visual Communications and Image Processing, 2003.

For encoding, DCVF decomposes the static light filed into high and low band images, which are then subject to spatial transforms to reduce any remaining spatial correlations. The transformed images, along with the associated disparity information, are entropy encoded to form the encoded bitstream. DCVF is typically implemented using the lifting-based wavelet transform scheme as shown in FIG. 3 with the images from spatially adjacent camera views as input. In addition, DCVF can be applied recursively to the output low band images. DCVF-based static light field compression provides a better compression efficiency than independently coding the multiple images. However, that method cannot be applied directly to multiview video encoding in which both the temporal correlation and correlation between views are exploited because there is no efficient method for predicting views that also accounts for correlation in time.

Therefore, there is a need for a compression method that exploits both temporal and inter-view correlations in multiview videos using wavelet transforms.

SUMMARY OF THE INVENTION

A method and system decompose multiview video acquired of a scene by multiple cameras.

Each multiview video includes a sequence of frames, and each camera provides a different view of the scene.

A prediction mode is selected from a temporal prediction mode, a spatial prediction mode, and a view interpolation prediction mode.

The multiview videos are then decomposed into low band frames, high band frames, and side information according to the selected prediction mode.

The multiview videos can also be interpolated to provide a novel view of the scene.

DETAILED DESCRIPTION OF THE PREFERRED EMBODIMENT

Our invention provides a joint temporal/inter-view decomposition method for encoding frames of multiview videos. The method exploits temporal correlation between frames within each view, as well as spatial correlation between frames in multiple camera views. The temporal correlation is exploited using motion compensated temporal filtering (MCTF), while the spatial correlation is exploited using disparity compensated inter-view filtering (DCVF).

The MCTF/DCVF decomposition according to the invention is block adaptive. The decomposition is performed using several prediction modes, including various forms of temporal prediction, various forms of spatial prediction, as well as view interpolation prediction. To determine the best prediction mode on a block basis, the invention provides a method for selecting of a multiview mode. The method can be used for any number of views and camera arrangements.

MCTF/DCVF Decomposition

Figure 1:
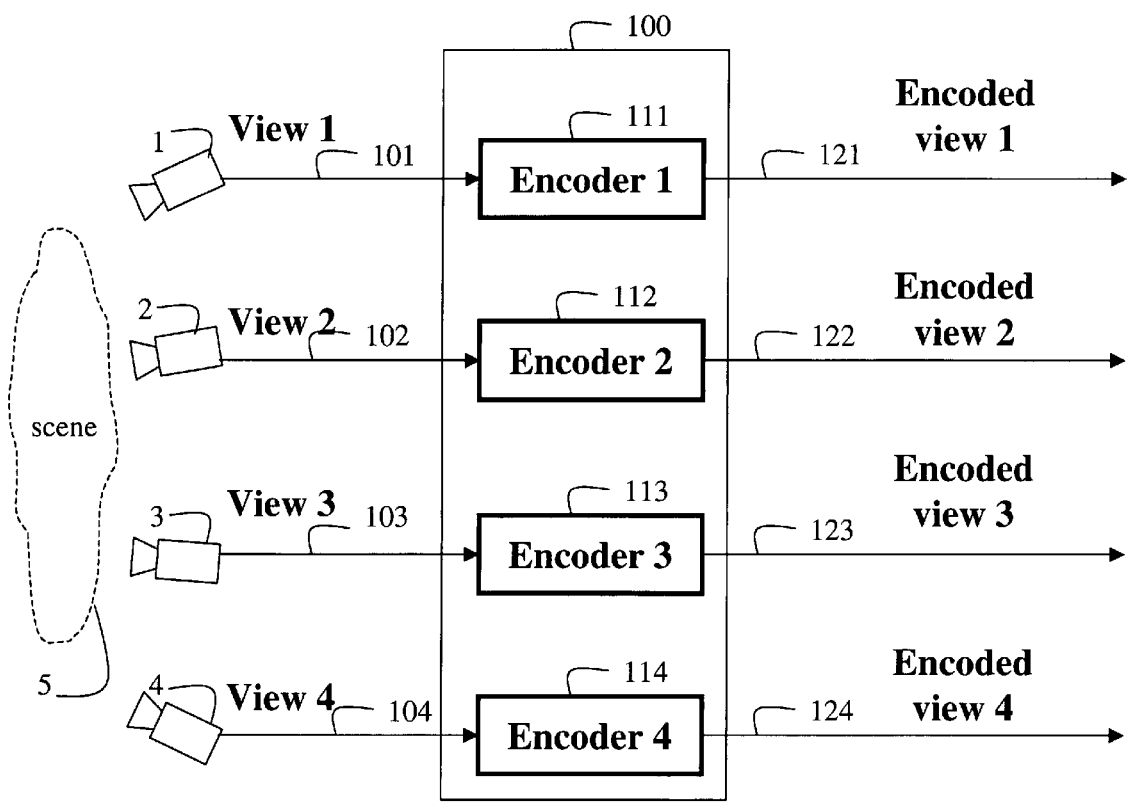
FIG. 1 is a block diagram of a prior art simulcast system for encoding multiview videos.
Figure 2:
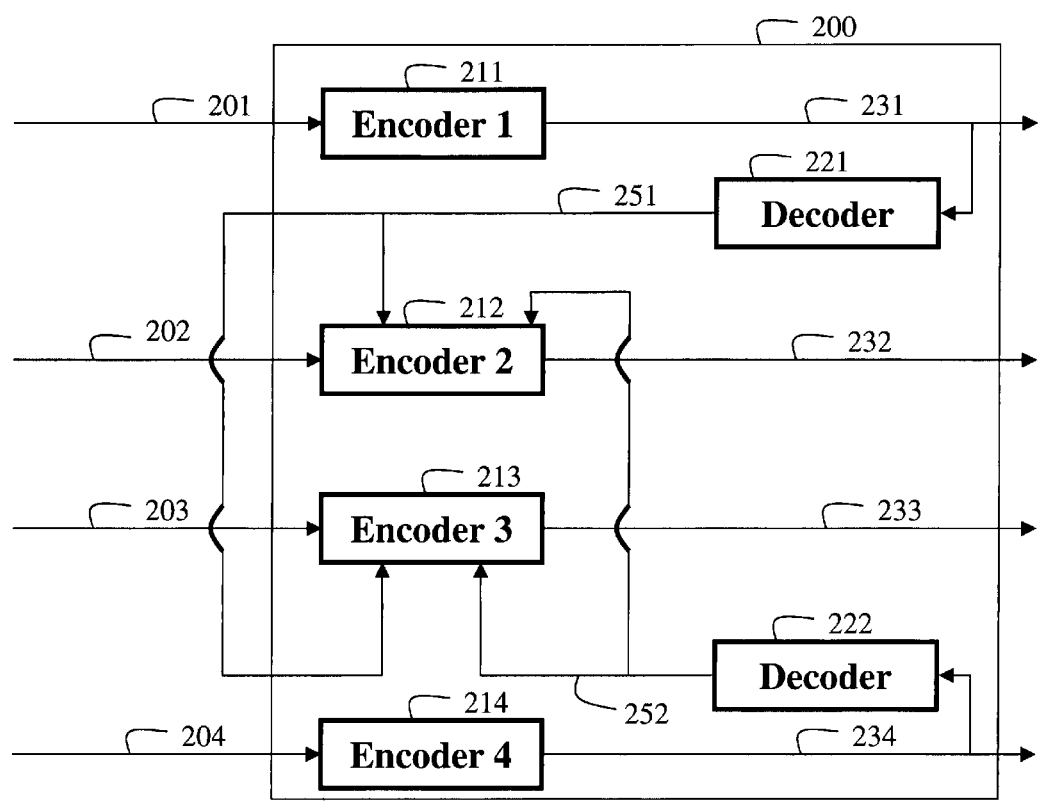
FIG. 2 is a block diagram of a prior art disparity compensated prediction system for encoding multiview videos
Figure 3:
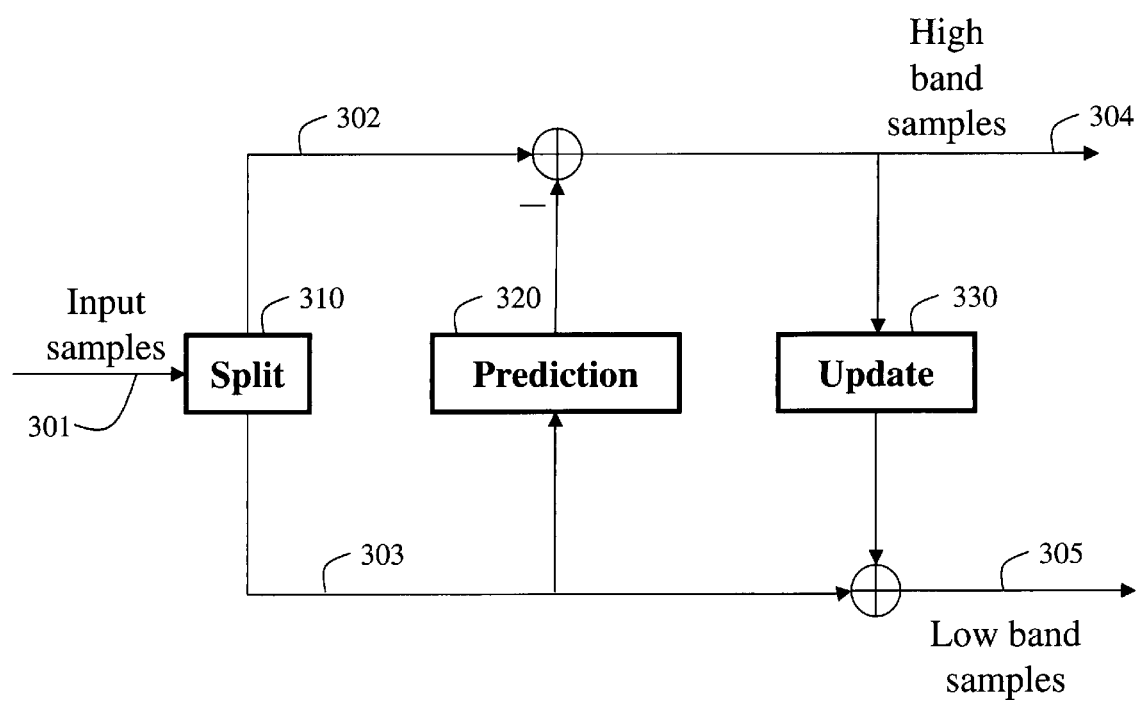
FIG. 3 is a flow diagram of a prior art wavelet decomposition.
Figure 4:
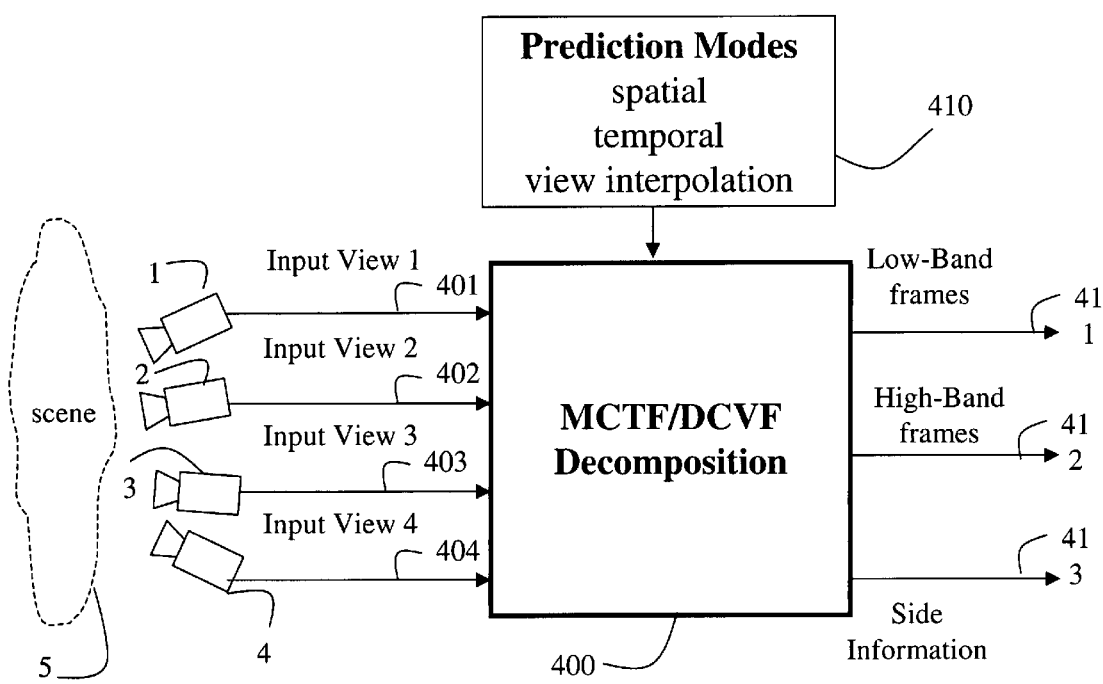
FIG. 4 is a block diagram of a MCTF/DCVF decomposition according to the invention.

FIG. 4 show the MCTF/DCVF decomposition 400 according to our invention. Frames of input videos 401-404 are acquired by camera 1-4 of a scene 5. Typically, the cameras are synchronized. Each input video provides a different 'view' of the scene. The input frames 401-404 are sent to a MCTF/DCVF decomposition 400. The decomposition produces encoded low-band frames 411, encoded high band frames 412, and associated side information 413. The high band frames essentially encode the prediction errors using the low band frames as reference frames. The decomposition is according selected prediction modes 410. The prediction modes include spatial, temporal, and view interpolation modes. The prediction modes can be selected adaptively on a per block basis.

Figure 5:
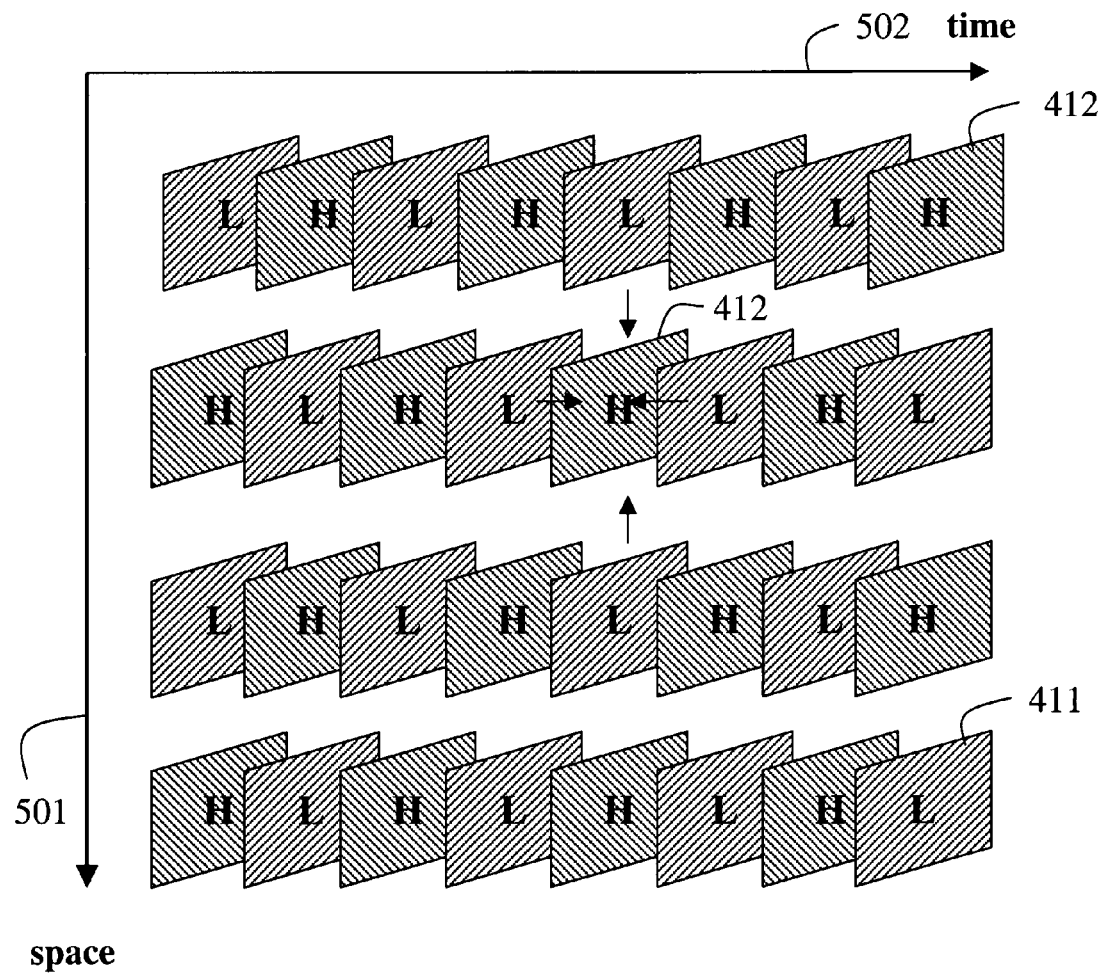
FIG. 5 is a block diagram of low-band images and high band images after the MCTF/DCVF decomposition according to the invention.

FIG. 5 shows a preferred alternating 'checkerboard pattern' of the low band frames (L) 411 and the high band frames (H) 412 for the frames of the views (space) 501 over time 502. Essentially, the pattern alternates low band frames and high band frames in the spatial dimension for a single instant in time, and additionally alternates the low band frames and the high band frames in time for a single view.

There are several advantages of this checkerboard pattern. The pattern spreads low band frames evenly in both the space (view) dimension and the time dimension, which achieves scalability in space and time when a decoder only reconstructs the low band frames. In addition, the pattern aligns the high band frames with neighboring low band frames in both the space and time dimensions. This is desirable to maximize the correlation between reference frames from which the predictions of the errors are made, as shown in FIG. 6.

According to a lifting-based wavelet transform, the high band frames are generated by predicting one set of samples from the other set of samples. The prediction may be achieved using a number of multiview modes including various forms of temporal prediction, various forms of spatial prediction, and a view interpolation prediction according to the invention described below.

The means by which the high band frames are predicted and the necessary information required to make the prediction are referred to as the side information 413. If a temporal prediction is performed, the temporal mode is signaled as part of the side information along with corresponding motion information. If a spatial prediction is performed, spatial mode is signaled as part of the side information along with corresponding disparity information. If view interpolation prediction is performed, the view interpolation mode is signaled: as part of the side information along with corresponding disparity, motion and depth information.

Figure 6:
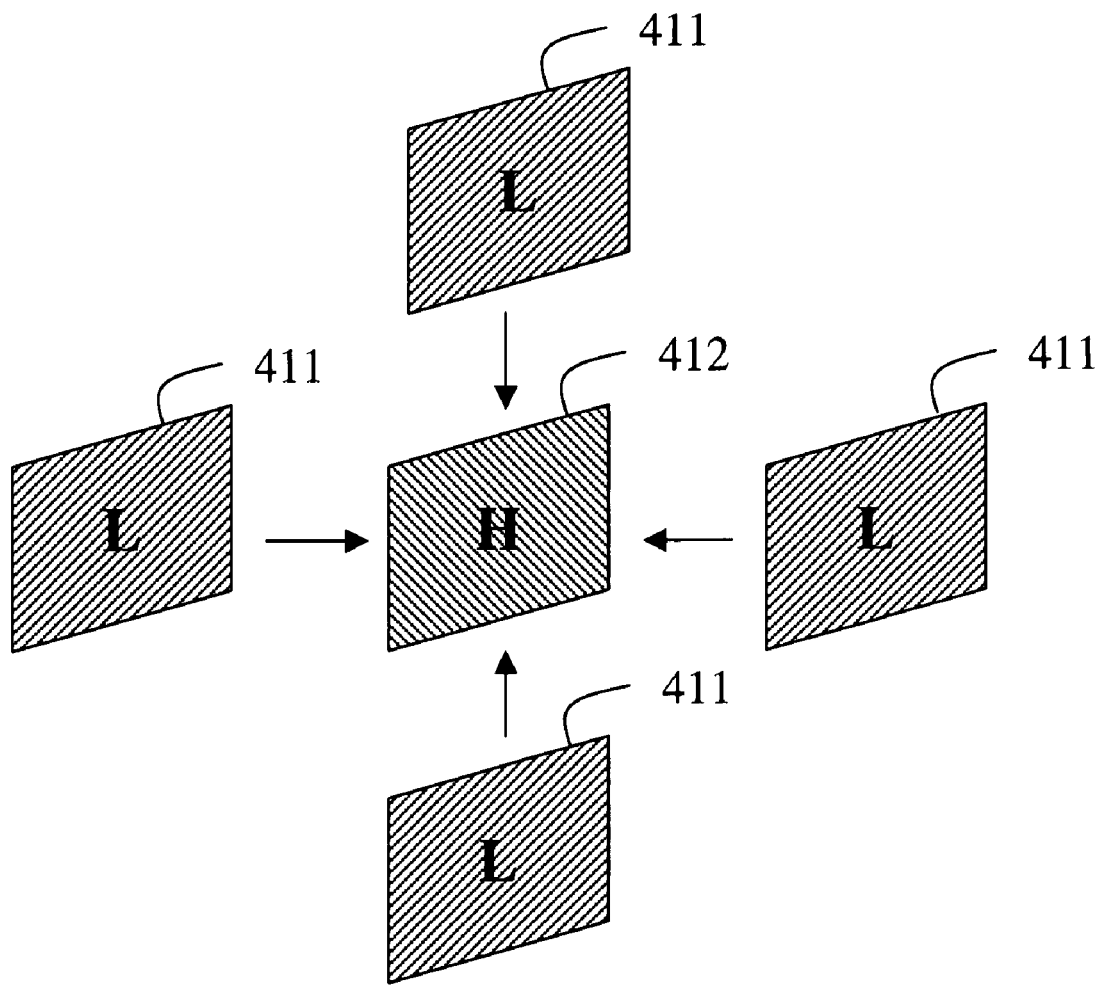
FIG. 6 is a block diagram of prediction of high band images from neighboring low-band images according to the invention.

As shown in FIGS. 5 and 6, the prediction of each high band frame 412 uses the 'nearest' low-band frames in the space and time dimensions.

The low band frames can be generated in different ways. In a first method, the designated low band frames, e.g., according to the checkerboard pattern in FIG. 5, are equal to the corresponding frames of the input views. In a second method, the designated low band frames are the result of an update step, which adds the high band frame, subject to an update operator, to the corresponding input frame.

In a first embodiment, the MCTF and DCVF are applied adaptively on a block-basis to the frames of the input views to yield a decomposed set of low band frames, as well as high band frames, and the associated side information. In this way, each block selects adaptively a best multiview mode of prediction among the available multiview modes described above. An optimal method for selecting the multiview mode is described below.

In a second embodiment, the MCTF is first applied to the frames of each camera view independently. The resulting frames are then further decomposed with the DCVF. In addition to the final decomposed frames, the corresponding side information is also generated. If performed on a block-basis, the prediction mode selections for the MCTF and the DCVF are considered separately. As an advantage, this mode selection inherently supports temporal scalability. In this way, lower temporal rates of the videos are easily accessed in the compressed bitstream.

In a third embodiment, the DCVF is first applied to the frames of the input views. The resulting frames are then temporally decomposed with the MCTF. In addition to the final decomposed frames, side information is also generated. If performed on a block-basis, the prediction mode selections for the MCTF and DCVF are considered separately. As an advantage, this selection inherently supports view scalability. In this way, a reduced number of the views are easily accessed in the compressed bitstream.

The decomposition described above can be applied recursively on the resulting set of low band frames from a previous decomposition stage. As an advantage, our MCTF/DCVF decomposition 400 effectively removes both temporal and inter-view (spatial) correlations and can achieve a very high compression efficiency. The compression efficiency of our multiview video encoder outperforms conventional simulcast encoding, which encodes each view independently from other views.

Coding of MCTF/DCVF Decomposition

Figure 7:
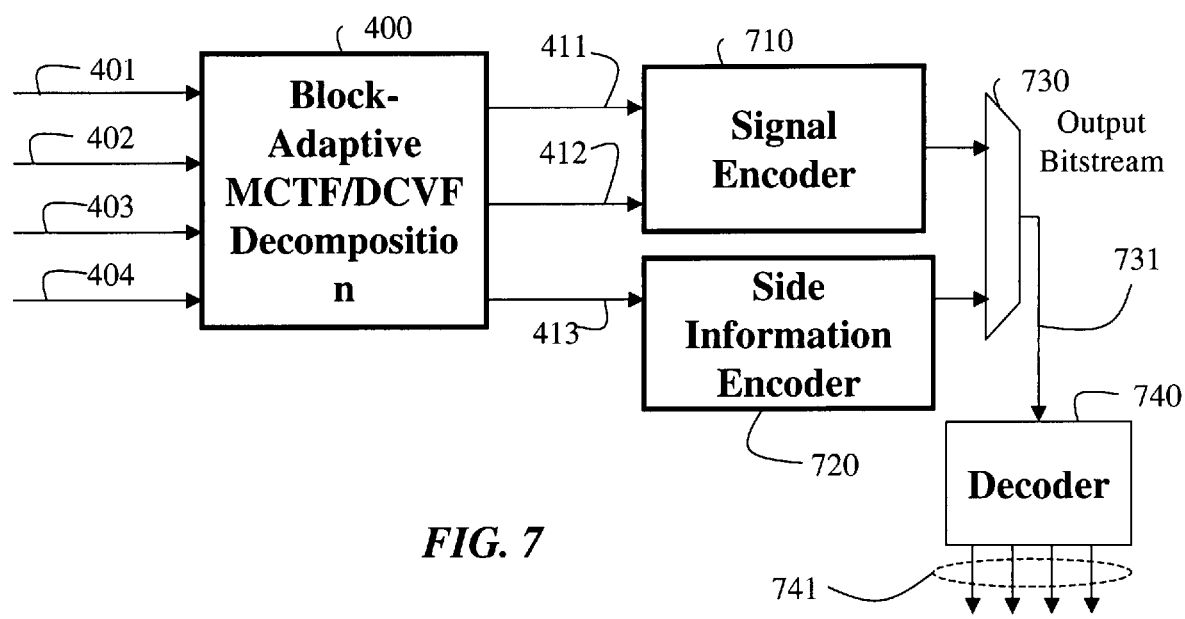
FIG. 7 is a block diagram of a multiview coding system using block-adaptive MCTF/DCVF decomposition according to the invention.

As shown in FIG. 7, a signal encoder 710 performs transform, quantization and entropy coding to remove the remaining correlations in the decomposed low band and high band frames 411-412. Such operations are well known in the art, Netravali and Haskell, Digital Pictures: Representation, Compression and Standards, Second Edition, Plenum Press, 1995.

A side information encoder 720 is responsible for encoding the side information generated as a result of the decomposition. Besides the multiview mode itself, the side information includes motion information corresponding to temporal predictions, disparity information corresponding to spatial prediction and view interpolation and depth information corresponding to view interpolation.

Encoding the side information may be achieved by known and established techniques, such as the techniques used in the MPEG-4 Visual standard, ISO/IEC 14496-2, "Information technology—Coding of audio-visual objects—Part 2: Visual," $2^{nd}$ Edition, 2001, or the more recent H.264/AVC standard, and ITU-T Recommendation H.264, "Advanced video coding for generic audiovisual services," 2004.

For instance, motion vectors are typically encoded using predictive methods that determine a prediction vector from neighboring vectors. The difference between the prediction vector and the current vector is then subject to an entropy coding process, which typically exploits the statistics of the prediction error. A similar procedure may be used to encode disparity vectors.

Furthermore, depth information for each block may compressed using predictive coding methods in which a prediction from neighboring blocks is obtained, or by simply using a fixed length code to express the depth value directly. If pixel level accuracy for the depth is extracted and compressed, more sophisticated texture coding techniques that apply transform, quantization and entropy coding techniques should be applied to this channel of information.

The encoded signals from the signal encoder 710 and side information encoder 720 can be multiplexed 730 to produce an encoded output bitstream 731.

Decoding of MCTF/DCVF Decomposition

The bitstream can be decoded 740 to recover multiview videos 741. Generally speaking, the decoder performs the inverse operations of the encoder to reconstruct the multiview videos. If all low band and high band images are decoded, the full set of frames in both the view dimension and time dimension at the encoded quality are reconstructed and available for rendering.

Depending on how many recursive levels of decomposition were applied in the encoder and which type of decompositions were applied, a reduced number of views and/or a reduced temporal rate may be decoded from the set of low band images and high band images that correspond to a reduced number, of views and reduced temporal rate.

View Interpolation

Figure 8:
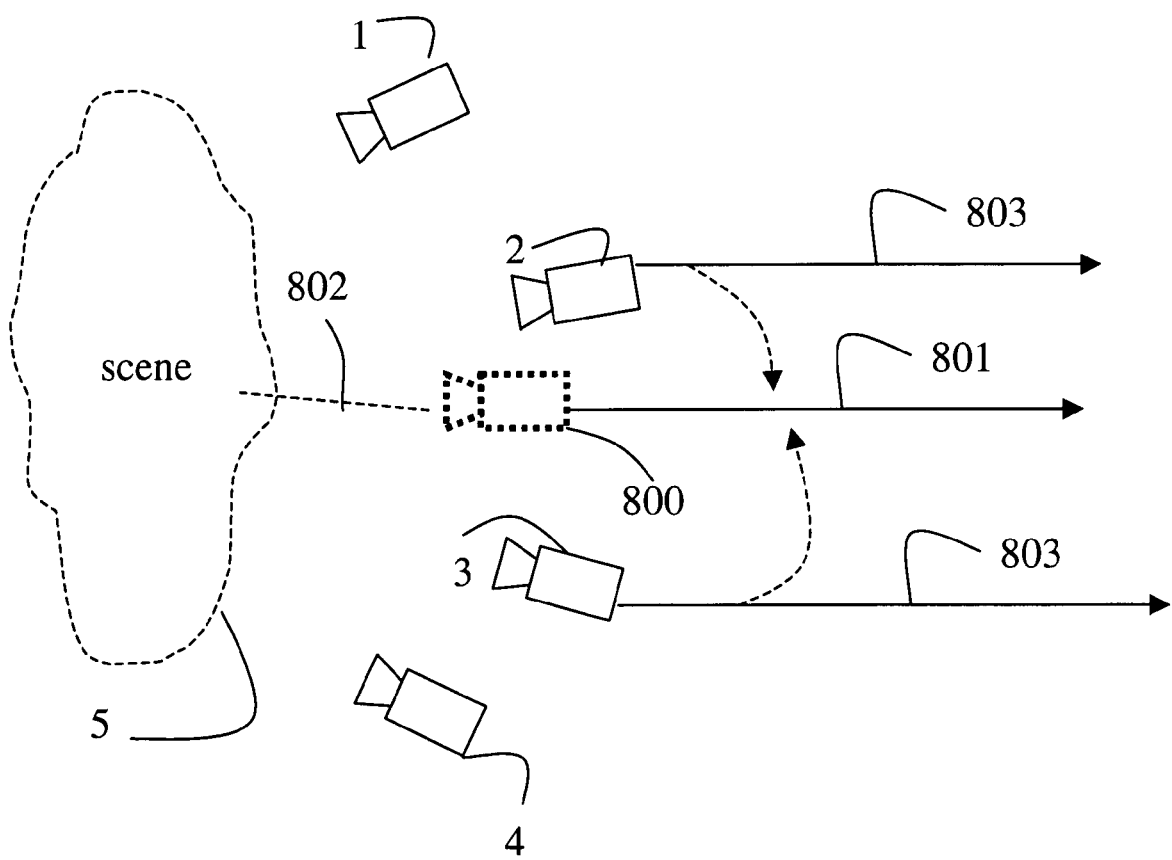
FIG. 8 is a schematic of view interpolation according to the invention.

As shown in FIG. 8, view interpolation is a process by which frames 801 of an interpolated view are generated from frames 803 of existing views. In other words, view interpolation provides a means to synthesize the frames 801 corresponding to a selected novel view 802 of the scene 5 by a new virtual camera 800 not present at the time the input videos were acquired.

Given the pixel values of frames of two or more reference views and the depth values of points in the scene, the pixels in the frames 801 of the target view 802 can be interpolated from the corresponding pixel values in the frames of the reference views.

In our invention, the view interpolation is based on low band images, which may be either input images or input images subject to the update step.

View interpolation is commonly used in computer graphics for rendering images with multiple views, see Buehler et al., "Unstructured Lumigraph Rendering," Proc. ACM SIG-GRAPH, 2001. That method requires extrinsic and intrinsic parameters for the cameras.

View interpolation techniques for compressing multiview videos is novel. In our invention, we generate view-interpolated frames to be used for prediction. View interpolation frames are generated at a location of designated high band frames and serve as reference frames from which a current interpolated frame is predicted.

One difficulty with this approach is that the depth values of the scene are unknown. Therefore, we estimate the depth values using known graphics techniques, e.g., based on feature correspondences in the multiple views. Alternatively, for each target view, we generate multiple view interpolation frames, each corresponding to a candidate depth value. For each block in the current frame, the best matching block in the set of view interpolation frames is determined. The view interpolation frame from which this best match is found indicates the depth value of the block in the current frame. This process is repeated for all block in the frame.

A difference between the current block and the view interpolation block is encoded and compressed by the signal encoder 710. The side information for this multiview mode is encoded by the side information encoder 720. The side information includes a signal indicating the view interpolation mode, the depth value of the block, and an optional displacement vector that compensates for any misalignments between the block in the current frame and the best matching block in the view interpolation frame to be compensated.

Multiview Mode Selection

In the block-adaptive MCTF/DCVF decomposition, the prediction mode m for each block can be selected by minimizing a cost function adaptively on a per block basis:

$$m^* = \underset{m}{\operatorname{argmin}} J(m),$$

where $J(m)=D(m)+\lambda R(m)$, and D is distortion, $\lambda$ is a weighting parameter, R is rate, m indicates the set of candidate prediction modes, and m* indicates the optimal prediction mode that has been selected based on the minimum cost criteria.

The candidate modes m include various modes of temporal prediction, spatial prediction, view interpolation prediction and intra prediction. The cost function J(m) depends on the rate and distortion resulting from coding the block using a specific mode m.

The distortion measures a difference between the reconstructed block and a source block. The reconstructed block is obtained by encoding and decoding the block using the given prediction mode m. A common distortion measure is a sum of squared difference.

The rate is the number of bits needed to encode the block, including the prediction error and all the side information.

The parameter $\lambda$ controls the rate-distortion tradeoff of the block coding, and may be derived from a quantization step size.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for decomposing multiview videos, comprising:
   acquiring a plurality of videos of a scene by a plurality of cameras, each video including a plurality of frames and each camera providing a different view of the scene;
   selecting a prediction mode in which the prediction mode is selected from a temporal prediction mode, a spatial prediction mode, and a view interpolation prediction mode; and
   decomposing, according to the selected prediction mode, the plurality of frames of the videos into a plurality of low band frames, a plurality of high band frames, and side information, in which the side information corresponding to the temporal prediction mode is motion information, the side information corresponding to the spatial prediction mode is disparity information, and the side information corresponding to the view interpolation prediction mode is motion, disparity and depth information.

2. The method of claim 1, in which the high band frames encode prediction errors based on the low band frames as reference frames and the selected prediction mode.

3. The method of claim 1, in which the low band frames and the high band frames form a checkerboard pattern, the checkerboard pattern alternating the low band frames and high band frames in a spatial dimension for a single instant in time, and the checkerboard pattern alternating the low band frames and the high band frames in a temporal dimension for a particular different view.

4. The method of claim 2, in which a lifting-based wavelet transform is performed on the low band frames to determine the high band frames that encodes the prediction errors.

5. The method of claim 3, further comprising:
   generating each high band frame based on predictions from four nearest low-band frames in the space dimension and the time dimensions.

6. The method of claim 1, in which the motion information is obtained by a motion estimation search on low band frames, and the disparity information is obtained by a disparity estimation search on low band frames.

7. The method of claim 1, in which the motion information is used to apply a motion compensated temporal filtering to the plurality of frames, and the disparity information is used to apply a disparity compensated inter-view filtering to the plurality of frames.

8. The method of claim 7, in which each frame includes a plurality of blocks of pixels, and the motion compensated temporal filtering and the disparity compensated inter-view filtering is performed adaptively to each block of each frame according to the selected prediction mode.

9. The method of claim 8, further comprising:
   minimizing a cost function $$m^* = \underset{m}{\operatorname{argmin}} J(m),$$

where J(m)=D(m)+λR(m), and D is distortion, λ is a weighting parameter, R is rate, m indicates the set of candidate modes, and m* indicates an optimal prediction mode that has been selected based on the cost function, to adaptively select the prediction mode.

10. The method of claim 7, in which the motion compensated temporal filtering is first applied independently to each video to obtain motion filtered frames, and then applying the disparity compensated inter-view filtering to the filtered frames to provide a temporal scalability for the decomposed videos.

11. The method of claim 7, in which the disparity compensated inter-view filtering is first applied to all frames for a single instant in time to obtain filtered frames, and then applying the motion compensated temporal filtering to the filtered frames to provide view scalability for the decomposed videos.

12. The method of claim 1, in which the decomposing is performed with a resulting set of low band frames from a previous decomposition stage.

13. The method of claim 1 in which the low band frames and the high band frames are transformed, quantized and entropy encoded to produce encoded frames, and further comprising:
   encoding the side information to produce encoded side information; and
   multiplexing the encoded frames and encoded side information to produce a bitstream.

14. The method of claim 1, further comprising:
   selecting a novel view and an instant of time;
   interpolating the low band frames neighboring the novel view and at the instant of time to form an interpolated frame; and
   generating the high band frame as a prediction error between a current frame and the interpolated frame.

15. The method of claim 14, in which the interpolating is based on a depth value.

16. The method of claim 15, in which the depth value is adaptively selected for each block of the current frame.

17. The method of claim 13, further comprising:
   decoding the bitstream to reconstruct the plurality of videos.

18. The method of claim 17, in which a number of views is reduced for the plurality of videos.

19. The method of claim 17, in which the reconstructed videos have a reduced temporal rate.

20. A system for decomposing multiview videos, comprising:
   a plurality of cameras configured to acquire a plurality of videos of a scene, each video including a plurality of frames and each camera providing a different view of the scene;
   means for selecting a prediction mode, in which the prediction mode is selected from a temporal prediction, a spatial prediction, and a view interpolation prediction; and
   means for decomposing, according to the selected prediction mode, the plurality of frames of the videos into a plurality of low band frames, a plurality of high band frames, and side information, and in which for the temporal prediction the side information corresponds to motion information, for the spatial prediction the side information corresponds to disparity information, and for the view interpolation prediction the side information corresponds to motion, disparity and depth information.

* * * * *